US009882760B2

(12) United States Patent
Guo et al.

(10) Patent No.: US 9,882,760 B2
(45) Date of Patent: Jan. 30, 2018

(54) METHOD AND WIRELESS COMMUNICATION DEVICE FOR ESTIMATING FREQUENCY OFFSET OF RECEIVED SIGNAL

(71) Applicant: Telefonaktiebolaget LM Ericsson (publ), Stockholm (SE)

(72) Inventors: Zhiheng Guo, Beijing (CN); Hai Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/508,984

(22) PCT Filed: Sep. 24, 2014

(86) PCT No.: PCT/CN2014/087297
§ 371 (c)(1),
(2) Date: Mar. 6, 2017

(87) PCT Pub. No.: WO2016/045012
PCT Pub. Date: Mar. 31, 2016

(65) Prior Publication Data
US 2017/0279652 A1    Sep. 28, 2017

(51) Int. Cl.
*H04L 27/00*    (2006.01)
*H04L 27/26*    (2006.01)
(Continued)

(52) U.S. Cl.
CPC .......... *H04L 27/2659* (2013.01); *H04L 27/14* (2013.01); *H04L 27/2675* (2013.01); *H04L 27/3818* (2013.01); *H04L 2027/0032* (2013.01)

(58) Field of Classification Search
CPC . H04B 1/69; H04B 7/00; H04B 10/04; H04B 10/06; H04K 1/10; H04L 5/00;
(Continued)

(56) References Cited

U.S. PATENT DOCUMENTS 6,259,748 B1    7/2001 Yim et al.
7,031,405 B1 *  4/2006 Touzni ................ H04L 27/0014
                                                      375/233
(Continued)

FOREIGN PATENT DOCUMENTS

CN    101087158 A    12/2007
CN    102036360 A     4/2011
(Continued)

OTHER PUBLICATIONS

Author Unknown, "Technical Specification Group Radio Access Network; Evolved Universal Terrestrial Radio Access (E-UTRA); Physical Channels and Modulation (Release 9)," Technical Specification 36.211, Version 9.1.0, 3GPP Organizational Partners, Mar. 2010, 85 pages.
(Continued)

*Primary Examiner* — Shawkat M Ali
(74) *Attorney, Agent, or Firm* — Withrow & Terranova, PLLC

(57) ABSTRACT

The present disclosure provides a method implemented in a wireless communication device for estimating a frequency offset between a carrier frequency of a received signal and a frequency of a local oscillator as well as the wireless communication device. The method comprises determining a plurality of phase change candidates for a phase change between a data symbol and a first reference symbol in the signal. The method further comprises generating a collection of constellation symbols from the data symbol and rotating the collection of constellation symbols by the plurality of phase change candidates. Then, one of the phase change candidates corresponding to one of the rotated collections of constellation symbols is selected in such a manner that said one of the rotated collections of constellation symbols matches a set of constellation points best. Next, the fre-
(Continued)

quency offset is determined based on the selected phase change candidate.

20 Claims, 10 Drawing Sheets

(51) Int. Cl.
*H04L 27/38* (2006.01)
*H04L 27/14* (2006.01)

(58) Field of Classification Search
CPC . H04L 7/00; H04L 25/00; H04L 27/06; H04L 27/14; H04L 27/22; H04L 27/26; H04L 27/2659; H04L 27/2675; H04L 27/3818; H04W 56/00
USPC ........ 370/252; 375/259, 260, 323, 329, 334, 375/343, 344, 354; 455/230, 507
See application file for complete search history.

(56) References Cited

U.S. PATENT DOCUMENTS

| | | | | | |
|---|---|---|---|---|---|
| 7,567,640 | B2* | 7/2009 | Chen | ................... | H04L 27/2662 327/155 |
| 8,605,799 | B2* | 12/2013 | Lu | ....................... | H04L 27/2657 375/259 |
| 8,675,788 | B2 | 3/2014 | Andgart et al. | | |
| 2007/0160158 | A1* | 7/2007 | Zeng | ....................... | H04L 5/023 375/260 |
| 2009/0034589 | A1* | 2/2009 | Hahm | .................. | H04B 1/7075 375/150 |
| 2011/0026649 | A1* | 2/2011 | Lipka | .................. | H04L 27/2659 375/343 |
| 2013/0022158 | A1* | 1/2013 | Panicker | ............... | H04L 5/0007 375/343 |
| 2013/0070874 | A1 | 3/2013 | Nakagawa et al. | | |
| 2013/0121188 | A1* | 5/2013 | Das | ....................... | H04W 56/00 370/252 |
| 2016/0142242 | A1* | 5/2016 | Azizi | .................. | H04L 27/2649 370/235 |

FOREIGN PATENT DOCUMENTS

| | | |
|---|---|---|
| CN | 102342072 A | 2/2012 |
| WO | 2004014008 A2 | 2/2004 |
| WO | 2014090135 A1 | 6/2014 |

OTHER PUBLICATIONS

Xiangfei, Liu et al., "An Estimation Algorithm of Large Frequency Offset on WCDMA Baseband Signal," Chinese Science and Technology Papers Online, http://www.paper.edu.cn, Sep. 3, 2013, Purcell Network Co., Ltd., 9 pages (Abstract Only).

International Search Report and Written Opinion for International Patent Application No. PCT/CN2014/087297, dated Jun. 3, 2015, 11 pages.

* cited by examiner

METHOD AND WIRELESS COMMUNICATION DEVICE FOR ESTIMATING FREQUENCY OFFSET OF RECEIVED SIGNAL

This application is a 35 U.S.C. §371 national phase filing of International Application No. PCT/CN2014/087297, filed Sep. 24, 2014, the disclosure of which is incorporated herein by reference in its entirety.

TECHNICAL FIELD

The present disclosure generally relates to the technical field of wireless communications, and particularly, to a method implemented in a wireless communication device for estimating a frequency offset between a carrier frequency of a received signal and a frequency of a local oscillator as well as the wireless communication device.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In Long Term Evolution (LTE) systems where Single Carrier Frequency Division Multiple Access (SC-FDMA) is used for uplink (i.e., from a User Equipment (UE) to an evolved NodeB (eNB)), the uplink reception performance may be seriously degraded by a frequency offset between a carrier frequency of a signal received at the eNB and a frequency of the eNB's local oscillator. Likewise, the downlink reception performance suffers from a frequency offset between a carrier frequency of a signal received at the UE and the eNB's local oscillator.

To guarantee an acceptable reception performance, it is thus necessary to estimate and compensate the frequency offset which mainly results from a Doppler frequency shift due to UE mobility.

In prior art (referring to US 2013/0070874 A1 for example), the estimation of the frequency offset is done by making use of the fact that the frequency offset causes a phase change between two OFDM reference symbols.

For illustration, the downlink subframe structure and the uplink subframe structure for LTE systems will be described with respect to FIGS. 1 and 2. As shown in the Figures, each subframe consists of a slot #0 and a slot #1, and each slot consists of seven OFDM symbols in case the subframe has a normal Cylic Prefix. Although not shown here, those skilled in the art will appreciate that each slot consists of six OFDM symbols in case the subframe has an extended CP.

More specifically, as illustrated in FIGS. 1 and 2 for the normal CP case, symbols #0, #4, #7 and #11 in a downlink subframe are used as reference symbols for channel estimation while the other symbols in the subframe are used as data symbols, and symbols #3 and #10 in an uplink subframe are used as reference symbols while the other symbols are used as data symbols. Likewise, for the extended CP case, both downlink and uplink subframes contain reference and data symbols.

According to the prior art frequency offset estimation approach US 2013/0070874 proposes, a phase change $\phi_{diff}$ ∈[−π,π) between two reference symbols are measured at first. Then, a preliminary frequency offset $f_{m\_est}$ is calculated as $$f_{m\_est} = \frac{\phi_{diff}}{2\pi t_d},$$

where $t_d$ denotes a time distance between the two reference symbols. By way of example, for a downlink subframe as illustrated in FIG. 1, the two reference symbols may be selected as symbols #4 and #7. In this case, $t_d$ is equal to 0.215 ms. For an uplink subframe as illustrated in FIG. 2, the two reference symbols may be selected as symbols #3 and #10. Accordingly, $t_d$ is equal to 0.5 ms.

Based on the preliminary frequency offset $f_{m\_est}$, a plurality of frequency offset candidates can be determined as $f_{n,offset} = f_{m\_est} + n \times f_{es}$, where $n \in \{0, \pm 1, \pm 2 \ldots\}$ and $f_{es}$ denotes an observation frequency which may take a value of $1/t_d$. Then, the received OFDM signal is decoded multiple times, with one of the plurality of frequency offset candidates applied to the received OFDM signal each time. In case the received OFDM signal is successfully decoded when a specific one of the plurality of frequency offset candidates is applied thereto, the frequency offset is determined as the specific frequency offset candidate.

One of the drawback of the prior art frequency offset estimation approach is that it cannot be applied to estimate the frequency offset for uplink reception in case frequency hopping is employed in the uplink. This is because, in the case of frequency hopping where different subcarriers are allocated to one UE in different slots, the phase change between the reference symbols #3 and #10 shown in FIG. 2 is no longer equal to $2\pi t_d f_{m\_est}$.

As another drawback of the prior art approach, the multiple attempts of decoding the received OFDM signal, to which the plurality of frequency offset candidates are respectively applied, consume large amounts of computation and power resources. The requirement for large amounts of computation resources may adversely incur high costs for the eNB and the UE. The consumption of large amounts of power resources may significantly reduce the UE's battery life.

SUMMARY

In view of the foregoing, an object of the present disclosure is to eliminate or at least alleviate one of the drawbacks of the prior art frequency offset estimation approach.

According to a first aspect of the present disclosure, there is provided a method implemented in a communication device for estimating a frequency offset between a carrier frequency of a received signal and a frequency of a local oscillator. The method comprises determining a plurality of phase change candidates for a phase change between a data symbol and a first reference symbol in the signal. The method further comprises generating a collection of constellation symbols from the data symbol and rotating the collection of constellation symbols by the plurality of phase change candidates. Then, one of the phase change candidates corresponding to one of the rotated collections of constellation symbols is selected in such a manner that said one of the rotated collections of constellation symbols matches a set of constellation points best. Next, the frequency offset is determined based on the selected phase change candidate.

Instead of basing the frequency offset estimation on a phase change between two reference symbols, the frequency offset estimation solution according to the present disclosure is based on a phase change between a data symbol and a reference symbol. Accordingly, it may work well even if frequency hopping is employed for a subframe structure where only one reference symbol exists in a single slot.

Additionally, unlike the prior approach which relies on decoding processes that are computation-intensive, the frequency offset estimation solution according to the present disclosure involves less complex operations, such as selecting one of a plurality of phase change candidates corresponding to one of rotated collections of constellation symbols which matches a set of constellation points best and determining the frequency offset based on the selected phase change candidate. Accordingly, the frequency offset estimation solution according to the present disclosure consumes less computation and power resources than the prior art approach.

In an embodiment, the generating the collection of constellation symbols from the data symbol may comprise demodulating the data symbol to obtain multiple constellation symbols. Then, a subset of the multiple constellation symbols may be selected as the collection of constellation symbols.

In an embodiment, the selecting one of the phase change candidates corresponding to one of the rotated collections of constellation symbols may comprise determining SNRs for the rotated collections of constellation symbols. Then, one of the phase change candidates corresponding to one of the rotated collections of constellation symbols may be selected, in such a manner that the SNR for said one of the rotated collections of constellation symbols is the highest one of said SNRs.

In an embodiment, the selecting one of the phase change candidates corresponding to one of the rotated collections of constellation symbols may comprise performing hard decision on the rotated collections of constellation symbols to obtain corresponding collections of constellation points and determining differences between the rotated collections of constellation symbols and their corresponding collections of constellation points. Then, one of the phase change candidates corresponding to one of the rotated collections of constellation symbols may be selected, in such a manner that the difference between said one of the rotated collections of constellation symbols and its corresponding collection of constellation points is the minimum one of the differences.

In an embodiment, the differences between the rotated collections of constellation symbols and their corresponding collections of constellation points may be determined as $((v_n - \bar{v}_n) \cdot w_n) \times ((v_n - \bar{v}_n) \cdot w_n)^H$, wherein $v_n$ denotes a vector formed by one of the rotated collections of constellation symbols, $\bar{v}_n$ denotes a vector formed by one of the collections of constellation points corresponding to said one of the rotated collections of constellation symbols, $w_n$ denotes a vector formed by amplitudes of said one of the rotated collections of constellation symbols, and $(.)^H$ denotes a conjugate transpose operation.

In an embodiment, the determining the phase change candidates may comprise determining the phase change candidates as a sequence of values in a range of $$[-\frac{\pi}{4}, \frac{\pi}{4}).$$

Optionally, the sequence of values may be equally spaced in the range of $$[-\frac{\pi}{4}, \frac{\pi}{4}).$$

In an embodiment, the determining the phase change candidates may comprise estimating a preliminary frequency offset based on a phase change between a second and a third reference symbols in the signal and determining a plurality of frequency offset candidates as a sequence of values centered around the preliminary frequency offset. Then, the plurality of phase change candidates may be determined based on the frequency offset candidates and a time offset between the data symbol and the first reference symbol. Optionally, the sequence of values are equally spaced by an observation frequency, wherein the observation frequency is equal to a reciprocal of a time distance between the second and the third reference symbols.

In an embodiment, the first reference symbol may be one of the second and the third reference symbols.

In an embodiment, the determining the frequency offset may comprise determining the frequency offset as the selected phase change candidate divided by $2\pi t_{i\text{-}iref}$, wherein $t_{i\text{-}iref}$ denotes a time offset between the data symbol and the first reference symbol.

In an embodiment, the determining the frequency offset may comprise determining a first group of phase change candidates as a sequence of values centered around the selected phase change candidate and spaced by $$\frac{\pi}{2},$$

estimating a phase change between the second and the third reference symbols in the signal and determining a second group of phase change candidates as a sequence of values centered around the estimated phase change and spaced by $2\pi$. The determining the frequency offset may further comprise calculating absolute differences between individual phase change candidates among the first group of phase change candidates scaled by $t_d/t_{i\text{-}iref}$ and individual phase change candidates among the second group of phase change candidates, wherein $t_{i\text{-}iref}$ denotes a time offset between the data symbol and the first reference symbol and $t_d$ denotes a time distance between the second and the third reference symbols. Then, one of the first group of phase change candidates and one of the second group of phase change candidates may be selected, in such a manner that the absolute difference between said one of the first group of phase change candidates scaled by $t_d/t_{i\text{-}iref}$ and said one of the second group of phase change candidates is the minimum one of the calculated absolute differences. Next, the frequency offset may be determined as said one of the first group of phase change candidate divided by $2\pi t_{i\text{-}iref}$ or said one of the second group of phase change candidates divided by $2\pi t_d$.

In an embodiment, the data symbol may be the closest data symbol to the first reference symbol. Additionally, the signal may be an OFDM signal and the data and reference symbols may be OFDM data and reference symbols.

By determining the phase change candidates as the sequence of values in the range of and determining the frequency offset as the selected phase change candidate divided by $2\pi t_{i\text{-}iref}$, a maximum frequency offset of about 1.75 kHz may be estimated for uplink reception. At the 2.6 GHz frequency band which is the operation band for LTE systems, even a moving speed up to 201 km/h cannot cause a Doppler frequency shift higher than 1.75 kHz. Accordingly, an accurate frequency offset can be estimated for a majority of LTE terminal devices in the real world which move at a speed lower than 201 km/h.

By determining the phase change candidates based on the plurality of frequency offset candidates derived from the preliminary frequency offset $f_{m\_est}$ instead of as the sequence of values in the range of $$[-\frac{\pi}{4}, \frac{\pi}{4})$$

or by determining the frequency offset based on the first and second groups of phase change candidates instead of as the selected phase change candidate divided by $2\pi t_{i\text{-}iref}$, the limitation on the maximum estimable frequency offset may be eliminated. Accordingly, an accurate frequency offset can be estimated for LTE terminal devices moving at a speed higher than 201 km/h.

According to a second aspect of the present disclosure, there is provided a communication device for estimating a frequency offset between a carrier frequency of a received signal and a frequency of a local oscillator. The communication device comprises a phase change candidate determination section, a constellation symbol collection generation section, a rotation section, a phase change selection section and a frequency offset determination section. The phase change candidate determination section is configured to determine a plurality of phase change candidates for a phase change between a data symbol and a first reference symbol in the signal. The constellation symbol collection generation section is configured to generate a collection of constellation symbols from the data symbol. The rotation section is configured to rotate the collection of constellation symbols by the plurality of phase change candidates. The phase change selection section is configured to select one of the phase change candidates corresponding to one of the rotated collections of constellation symbols, in such a manner that said one of the rotated collections of constellation symbols matches a set of constellation points best. The frequency offset determination section is configured to determine the frequency offset based on the selected phase change candidate.

According to a third aspect of the present disclosure, there is provided a communication device for estimating a frequency offset between a carrier frequency of a received signal and a frequency of a local oscillator. The communication device comprises a processor and a memory. The memory has machine-readable program code stored therein. When executed by the processor, the program code causes the communication device to perform the method according to the first aspect of the present disclosure.

According to a fourth aspect of the present disclosure, there is provided a communication device for estimating a frequency offset between a carrier frequency of a received signal and a frequency of a local oscillator. The communication device comprises means adapted to determine a plurality of phase change candidates for a phase change between a data symbol and a first reference symbol in the signal, to generate a collection of constellation symbols from the data symbol and to rotate the collection of constellation symbols by the plurality of phase change candidates. The means is further adapted to select one of the phase change candidates corresponding to one of the rotated collections of constellation symbols, in such a manner that said one of the rotated collections of constellation symbols matches a set of constellation points best, and to determine the frequency offset based on the selected phase change candidate.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF EMBODIMENTS

Figure 1:
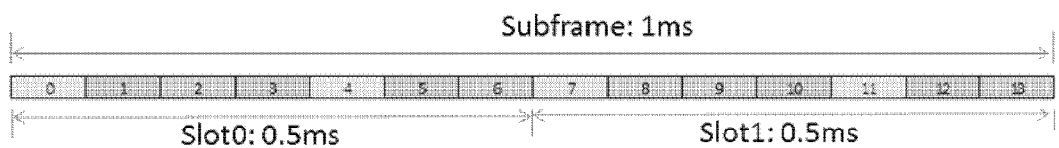
FIG. 1 is a diagram illustrating a structure of a downlink subframe for LTE systems.

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail.

Those skilled in the art will appreciate that the functions described may be implemented in one or in several nodes. Some or all of the functions described may be implemented using hardware circuitry, such as analog and/or discrete logic gates interconnected to perform a specialized function, Application Specific Integrated Circuits (ASICs), Programmable Logical Arrays (PLAs), etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Note that although terminology commonly used to describe LTE technology, as standardized by the 3$^{rd}$ Generation Partnership Project (3GPP), is used in this disclosure to exemplify the embodiments, this should not be seen as limiting the scope of the techniques to only the aforementioned system. Other wireless systems may also benefit from exploiting the ideas covered within this disclosure, as long as each of data symbols communicated in the systems has multiple constellation symbols modulated therein.

Instead of determining the frequency offset of a received signal based on a phase change between two reference symbols in the signal, the disclosed frequency offset estimation solution takes advantage of the fact that the frequency offset causes a phase change between a data symbol and a reference symbol in the received signal.

Figure 3:
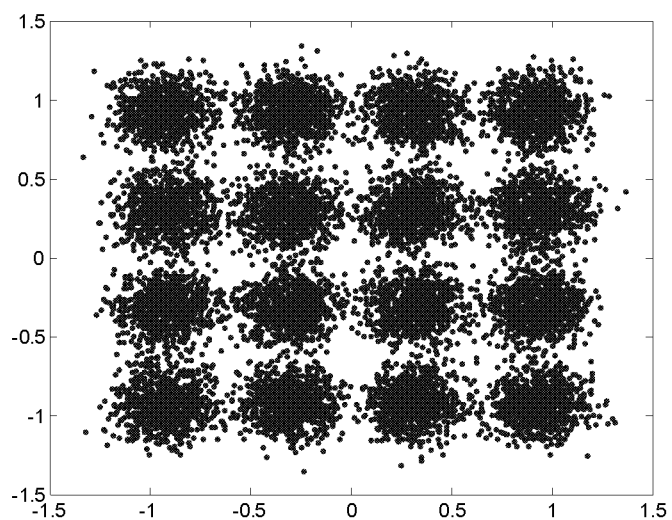
FIG. 3 is diagram illustrating constellation symbols demodulated from a data symbol in case there is no frequency offset.

To illustrate this, FIG. 3 shows a set of 16QAM constellation symbols obtained by demodulating an OFDM data symbol in case there is no frequency offset. Note that 16QAM constellation symbols are given here for illustration purpose only. Other constellation symbols, such as Quadrature Phase Shift Keying (QPSK) symbols, 16 Quadrature Amplitude Modulation (QAM) symbols or 64QAM symbols, may be obtained if corresponding modulation schemes are applied.

Figure 2:
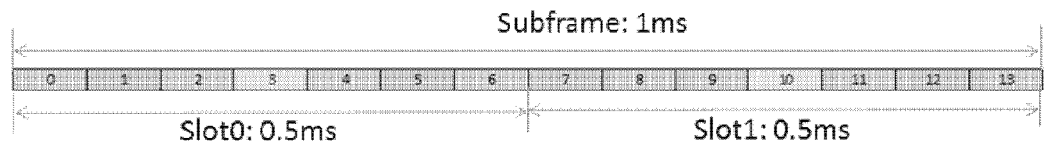
FIG. 2 is a diagram illustrating a structure of an uplink subframe for LTE systems.
Figure 4:
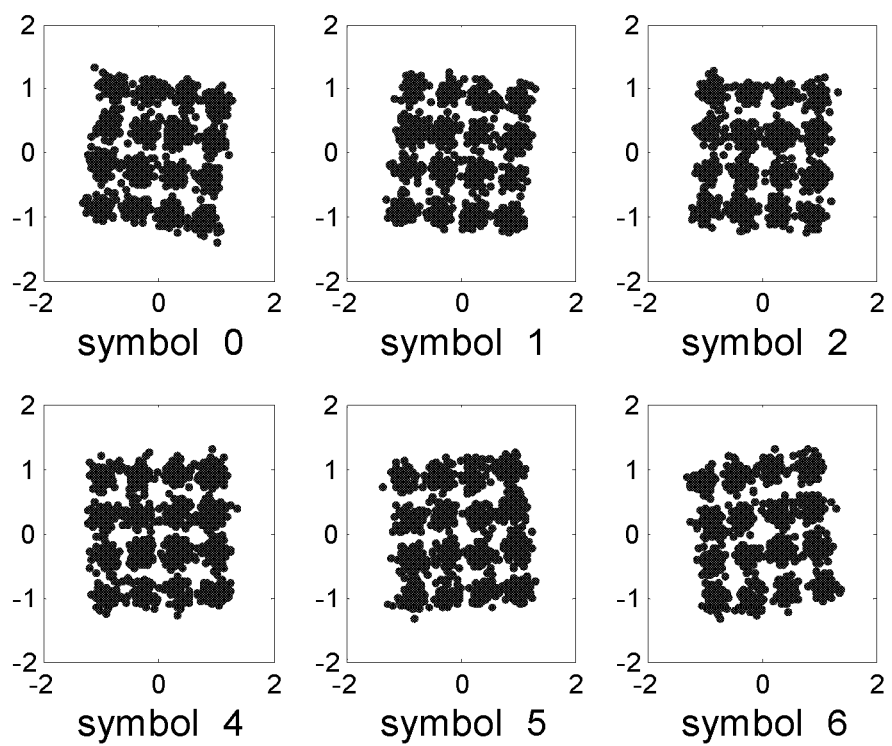
FIG. 4 is diagram illustrating constellation symbols demodulated from data symbols in one slot of the uplink subframe shown in FIG. 2 in case a frequency offset exists.

By comparison, FIG. 4 shows six phase-shifted sets of constellation symbols obtained respectively from OFDM data symbols #0-2 and #4-6 in slot #0 of the uplink subframe shown in FIG. 2. Thus, between each of the data symbols #0-2 and #4-6 and the reference symbol #3, there exists a phase change caused by the frequency offset. It is this phase change that is employed in the disclosed solution for frequency offset estimation.

Figure 5:
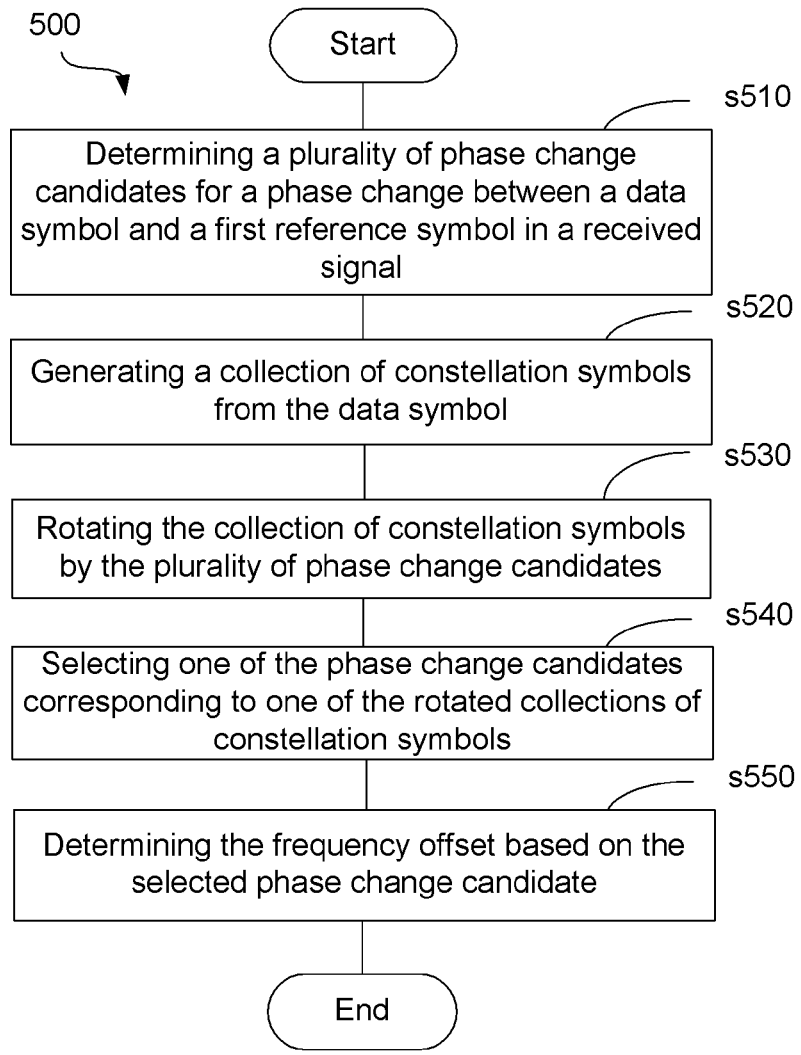
FIGS. 5-12 are flowcharts illustrating operations of a method implemented in a wireless communication device according to embodiments of the present disclosure.

FIG. 5 schematically illustrates a method 500 implemented in a wireless communication device, which may be either a radio base station or a terminal device, for estimating a frequency offset between a carrier frequency of a received signal and a frequency of a local oscillator according to the present disclosure.

As illustrated, initially, a plurality of phase change candidates for a phase change between a data symbol and a first reference symbol in the signal are determined at block s510, and a collection of constellation symbols is generated from the data symbol at block s520. In practical implementation, the first reference symbol may be any of the reference symbols in the received signal. The data symbol may be the closest data symbol to the first reference symbol, although the present disclosure is not limited in this regard.

Figure 6:
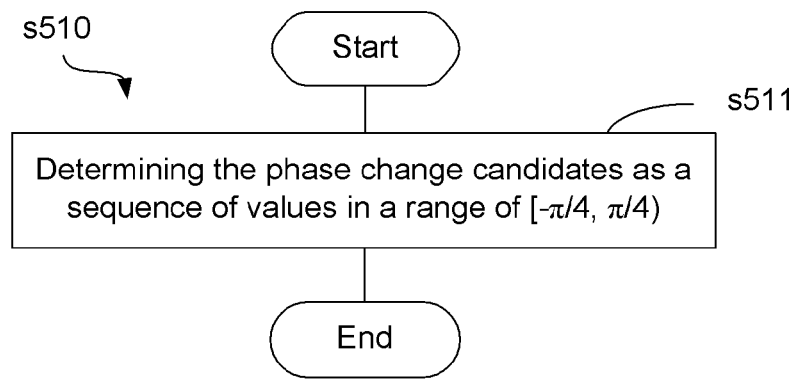

In an embodiment, the operation shown at block s510 may be implemented by determining the phase change candidates as a sequence of values in a range of $$[-\frac{\pi}{4}, \frac{\pi}{4}),$$

as illustrated at block s511 in FIG. 6. By way of illustration rather than limitation, the phase change candidates may be determined as $$0, \pm\frac{(\frac{\pi}{4})}{N}, \pm\frac{2(\frac{\pi}{4})}{N}, \ldots, \pm\frac{(N-1)(\frac{\pi}{4})}{N}, \frac{\pi}{4},$$

where N is a positive value. As those skilled in the art will appreciate, the sequence of phase change candidate values may also contain an odd number of values and/or be unequally spaced in the range of $$[-\frac{\pi}{4}, \frac{\pi}{4}).$$

In practical implementation, the first reference symbol mentioned above may be the same as one of the second and the third reference symbols or different from either of the second and the third reference symbols.

Figure 8:
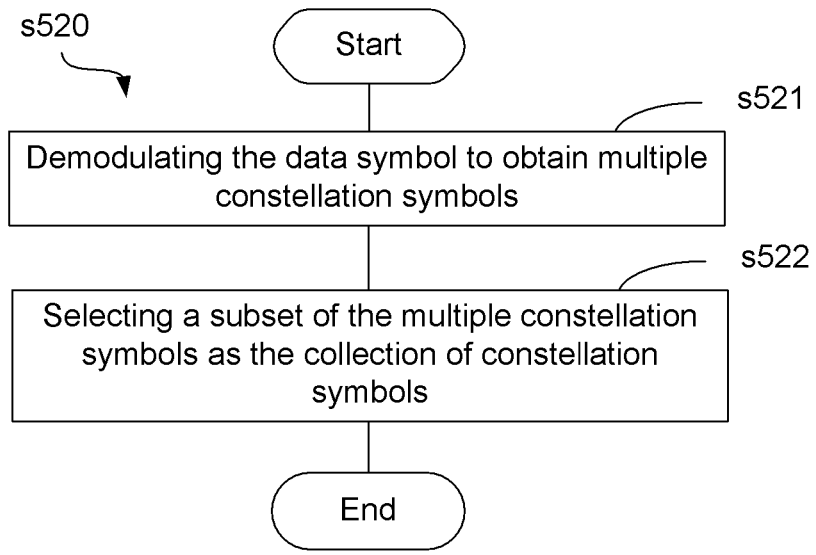
Figure 9:
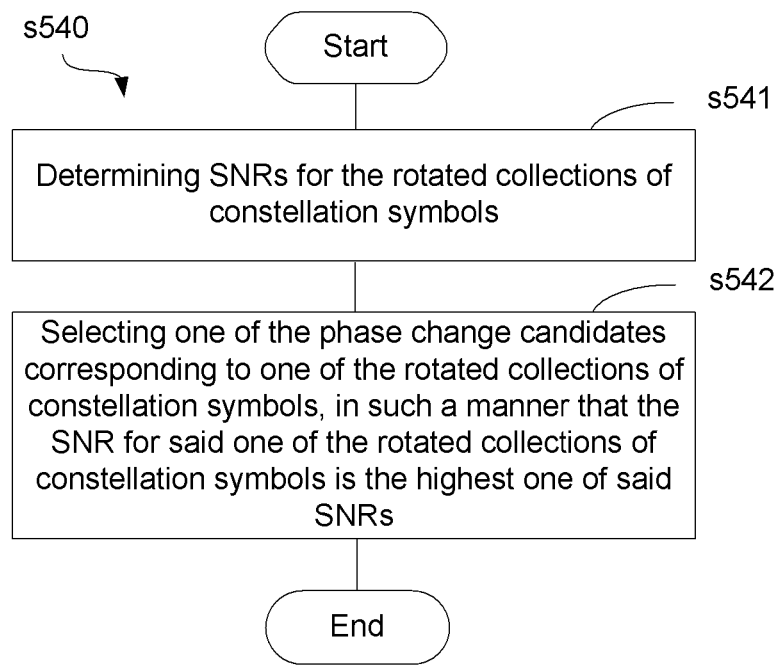

In an embodiment, the operation shown at block s520 may comprise operations shown at blocks s521 and s522 in FIG. 8. At block s521, the data symbol may be demodulated to obtain multiple constellation symbols. Then, at block s522, a subset of the multiple constellation symbols may be selected as the collection of constellation symbols.

In this manner, a tradeoff between the accuracy of frequency offset estimation and the consumption of computation resources may be achieved by controlling the number of constellation symbols in the selected subset of the multiple constellation symbols.

Referring back to FIG. 5, after block s520, the collection of constellation symbols is rotated by the plurality of phase change candidates at block s530. Then, at block s540, one of the phase change candidates corresponding to one of the rotated collections of constellation symbols is selected, in such a manner that said one of the rotated collections of constellation symbols matches a set of constellation points best. Finally, the frequency offset is determined based on the selected phase change candidate at block s550.

Here, the constellation points refer to noise free points in a constellation which is used at the transmission side to map a predetermined number of information bits to one of the constellation points and the constellation symbols refer to noisy points in the constellation obtained by demodulating an OFDM data symbol. By way of example, for QPSK, there are 4 constellation points in the constellation and each set of 2 bits is mapped to one of the constellation points; for 16/64QAM, there are 16/64 constellation points in the constellation and each set of 4/6 bits is mapped to one of the constellation points.

In an embodiment, the operation shown at block s540 may comprise operations shown at blocks s541 and s542 in FIG.

9. At block s541, Signal to Noise Ratios (SNRs) may be determined for the rotated collections of constellation symbols. Then, at block s542, one of the phase change candidates corresponding to one of the rotated collections of constellation symbols may be selected, in such a manner that the SNR for said one of the rotated collections of constellation symbols is the highest one of the SNRs.

As an exemplary implementation, the SNR for each of the rotated collections of constellation symbols may be determined by firstly determining individual SNRs for the constellation symbols in the collection and then performing arithmetic operations such as addition, subtraction, multiplication and division on the individual SNRs.

Figure 10:
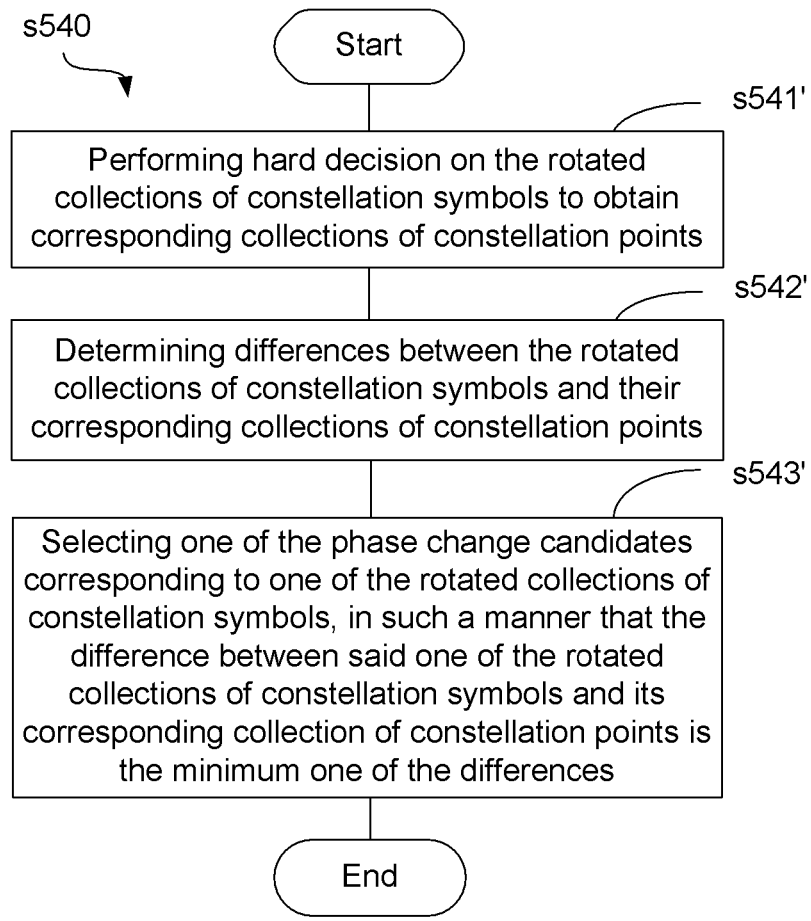

Alternatively, the operation shown at block s540 may comprise operations shown at blocks s541'-s543' in FIG. 10. At block s541', hard decision may be performed on the rotated collections of constellation symbols to obtain corresponding collections of constellation points. Then, at block s542', differences between the rotated collections of constellation symbols and their corresponding collections of constellation points may be determined. Next, at block s543', one of the phase change candidates corresponding to one of the rotated collections of constellation symbols may be selected, in such a manner that the difference between said one of the rotated collections of constellation symbols and its corresponding collection of constellation points is the minimum one of the differences.

As an exemplary implementation, the differences between the rotated collections of constellation symbols and their corresponding collections of constellation points may be determined as $$((v_n - \bar{v}_n) \cdot w_n) \times ((v_n - \bar{v}_n) \cdot w_n)^H,$$

wherein $v_n$ denotes a vector formed by one of the rotated collections of constellation symbols, $\bar{v}_n$ denotes a vector formed by one of the collections of constellation points corresponding to said one of the rotated collections of constellation symbols, $w_n$ denotes a vector formed by amplitudes of said one of the rotated collections of constellation symbols, and $(.)^H$ denotes a conjugate transpose operation.

As a simplified implementation, the above formula may be reduced as $(v_n - \bar{v}_n) \times (v_n - \bar{v}_n)^H$ by omitting the weighting factor $w_n$.

Figure 11:
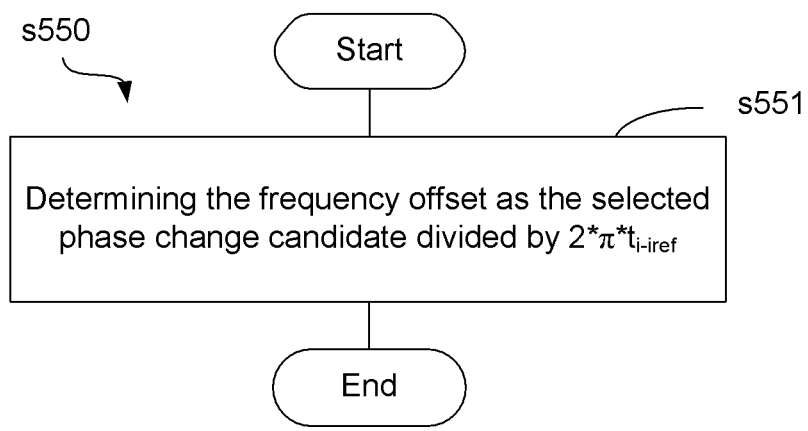

In an embodiment, the operation shown at block s550 may be implemented by dividing the phase change candidate selected at block s540 by $2\pi t_{i-iref}$, as illustrated at block s551 in FIG. 11.

By determining the phase change candidates as the sequence of values in the range of $$\left[-\frac{\pi}{4}, \frac{\pi}{4}\right)$$

and determining the frequency offset as the selected phase change candidate divided by $2\pi t_{i-iref}$, a maximum frequency offset of 1.75 kHz may be estimated for uplink reception. At the 2.6 GHz frequency band which is the operation band for LTE systems, even a moving speed up to 201 km/h cannot cause a Doppler frequency shift higher than 1.75 kHz. Accordingly, an accurate frequency offset can be estimated for a majority of LTE terminal devices in the real world which move at a speed lower than 201 km/h.

Figure 7:
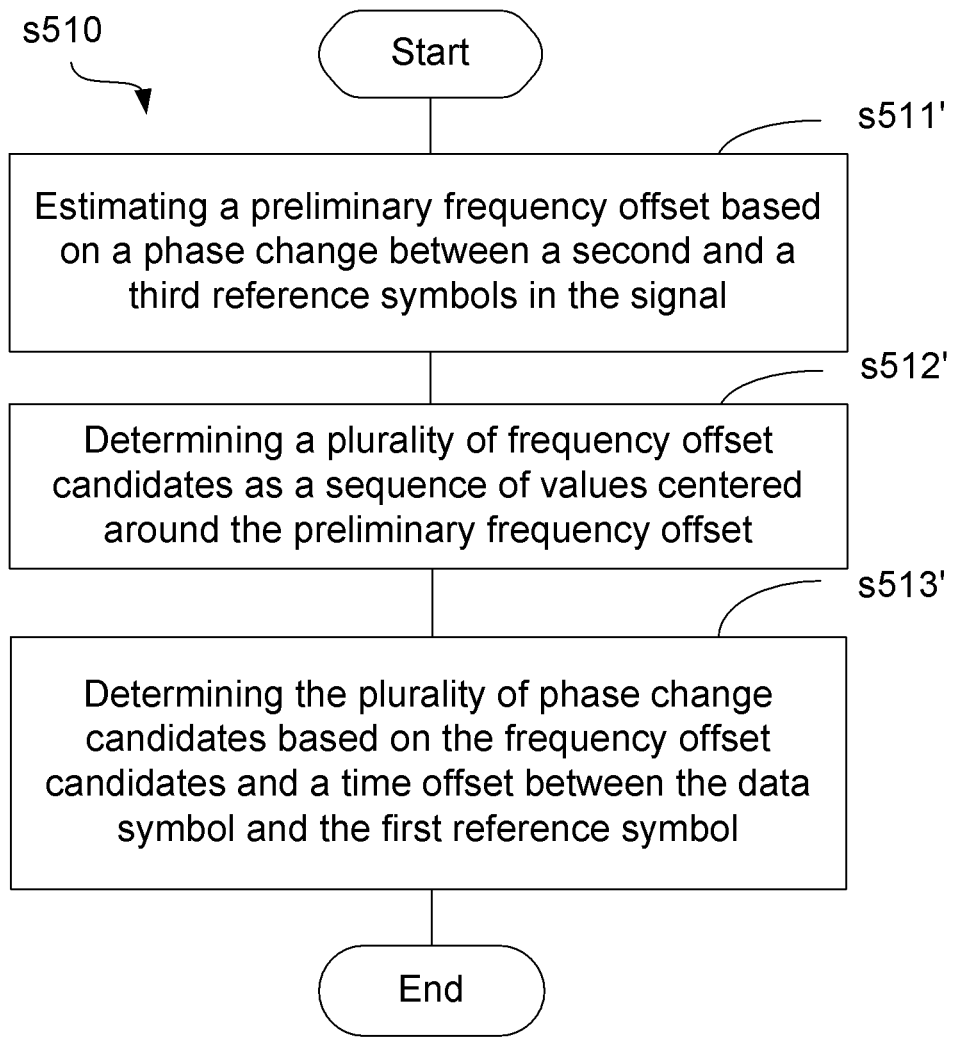

In an embodiment, the operation shown at block s510 may comprise operations shown at blocks s511'-s513' in FIG. 7 instead of comprising only the operation shown at block s511 in FIG. 6. At block s511', a preliminary frequency offset $f_{m\_est}$ may be determined based on a phase change $\emptyset_{diff}$ between a second and a third reference symbols in the received signal as in the prior art frequency offset estimation approach. Then, at block s512', a plurality of frequency offset candidates may be determined as a sequence of values centered around the preliminary frequency offset $f_{m\_est}$. Next, at block s513', the plurality of phase change candidates may be determined based on the frequency offset candidates and a time offset $t_{i-iref}$ between the data symbol and the first reference symbol. Specifically, the phase change candidates may be determined as the frequency offset candidates multiplied by $2\pi t_{i-iref}$.

By determining the plurality of phase change candidates for the phase change between the data symbol and the first reference symbol in the signal as above and determining the frequency offset as the selected phase change candidate divided by $2\pi t_{i-iref}$, the maximum estimable frequency offset for uplink reception may be increased beyond 1.75 kHz. Accordingly, an accurate frequency offset can be estimated for LTE terminal devices moving at an arbitrarily high speed.

As those skilled in the art will appreciate, the sequence of frequency offset candidate values may be either equally or unequally spaced. In the former case, the sequence of values may be spaced by an observation frequency which is equal to a reciprocal of a time distance between the second and the third reference symbols.

Figure 12:
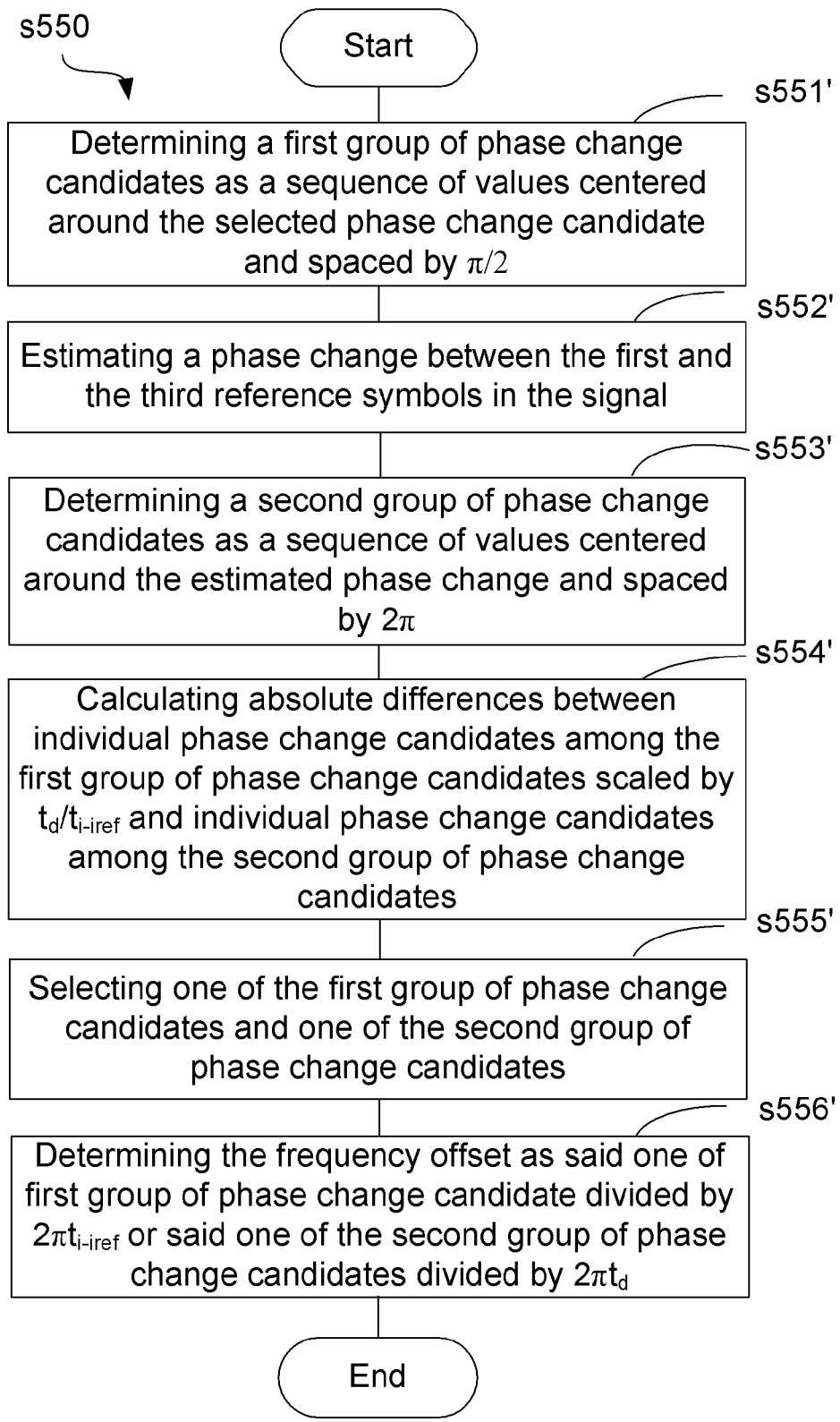

As an alternative or additional approach to eliminate the limitation on the maximum estimable frequency offset, the operation shown at block s550 may comprise operations shown at blocks s551'-s556' in FIG. 12 instead of comprising only the operation shown at block s551 in FIG. 11. At block s551', a first group of phase change candidates may be determined as a sequence of values spaced by $\pi/2$ and centered around the phase change candidate selected at step s540.

At block s552', a phase change between the second and the third reference symbols in the received signal may be estimated, and then at block s553' a second group of phase change candidates may be determined as a sequence of values centered around the estimated phase change and spaced by $2\pi$.

At block s554', absolute differences between individual phase change candidates among the first group of phase change candidates scaled by $t_d/t_{i-iref}$ and individual phase change candidates among the second group of phase change candidates may be calculated, wherein $t_{i-iref}$ denotes the time offset between the data symbol and the first reference symbol and $t_d$ denotes the time distance between the second and the third reference symbols.

At block s555', one of the first group of phase change candidates and one of the second group of phase change candidates may be selected, in such a manner that the absolute difference between said one of the first group of phase change candidates scaled by $t_d/t_{i-iref}$ and said one of the second group of phase change candidates is the minimum one of the calculated absolute differences.

At block s556's, the frequency offset may be determined as said one of the first group of phase change candidate divided by $2\pi t_{i-iref}$ or said one of the second group of phase change candidates divided by $2\pi t_d$.

By determining the phase change candidates as the sequence of values in the range of $$\left[-\frac{\pi}{4}, \frac{\pi}{4}\right)$$

and determining the frequency offset as above, the limitation on the maximum estimable frequency offset may also be eliminated.

In practical implementation, either the first group of phase change candidates or the second group of phase change candidates may contain an odd or even number of candidate values, and the number of candidates in the first group may be different from the number of candidates in the second group.

Correspondingly to the above-described method 500, a wireless communication device may be provided for estimating a frequency offset between a carrier frequency of a received signal and a frequency of a local oscillator. The wireless communication device comprises means adapted to determine a plurality of phase change candidates for a phase change between a data symbol and a first reference symbol in the signal, to generate a collection of constellation symbols from the data symbol and to rotate the collection of constellation symbols by the plurality of phase change candidates. The means is further adapted to select one of the phase change candidates corresponding to one of the rotated collections of constellation symbols, in such a manner that said one of the rotated collections of constellation symbols matches a set of constellation points best, and to determine the frequency offset based on the selected phase change candidate. As set forth above, the wireless communication device may be a radio base station or a terminal device.

Advantageously, the wireless communication device according to the present invention may work well even if frequency hopping is employed for a subframe structure where only one reference symbol exists in a single slot. Moreover, it consumes less computation and power resources than the prior art frequency offset estimation approach which relies on decoding processes.

In the following, a functional architecture of the wireless communication device according to an example wireless communication device 1300 of the present disclosure will be given with reference to FIG. 13.

Figure 13:
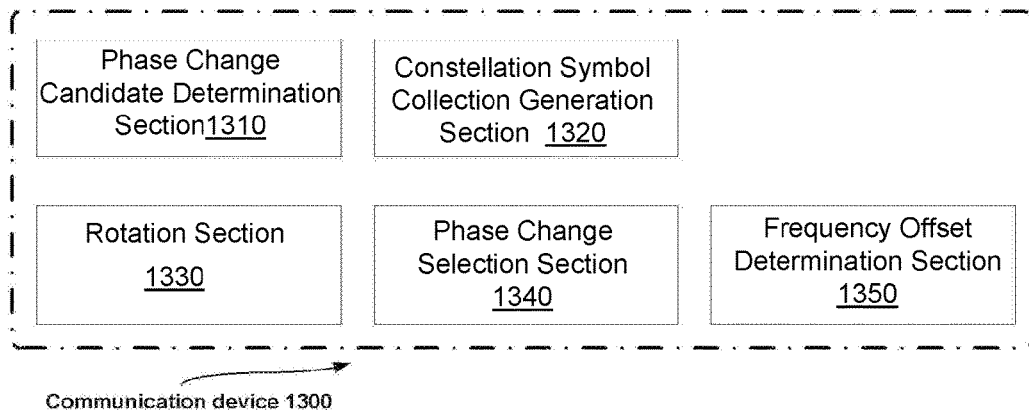
FIGS. 13-18 are block diagrams illustrating functional modules of a wireless communication device according to embodiments of the present disclosure.

As shown in FIG. 13, the wireless communication device 1300 comprises a phase change candidate determination section 1310, a constellation symbol collection generation section 1320, a rotation section 1330, a phase change selection section 1340 and a frequency offset determination section 1350. The phase change candidate determination section 1310 is configured to determine a plurality of phase change candidates for a phase change between a data symbol and a first reference symbol in the signal. The constellation symbol collection generation section 1320 is configured to generate a collection of constellation symbols from the data symbol. The rotation section 1330 is configured to rotate the collection of constellation symbols by the plurality of phase change candidates. The phase change selection section 1340 is configured to select one of the phase change candidates corresponding to one of the rotated collections of constellation symbols, in such a manner that said one of the rotated collections of constellation symbols matches a set of constellation points best. The frequency offset determination section 1350 is configured to determine the frequency offset based on the selected phase change candidate.

Figure 14:
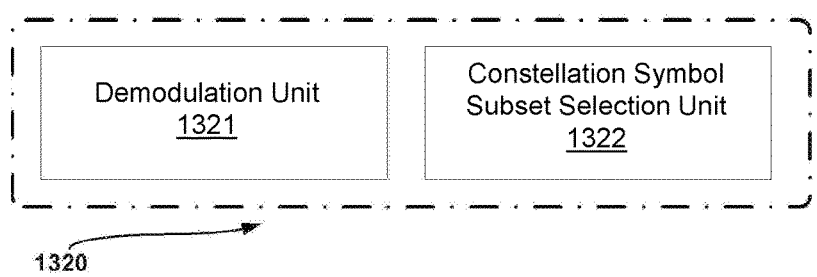

In an embodiment, the constellation symbol collection generation section 1320 may comprise a demodulation unit 1321 and a constellation symbol subset selection unit 1322 as illustrated in FIG. 14. The demodulation unit 1321 may be configured to demodulate the data symbol to obtain multiple constellation symbols. The constellation symbol subset selection unit 1322 may be configured to select a subset of the multiple constellation symbols as the collection of constellation symbols.

Figure 15:
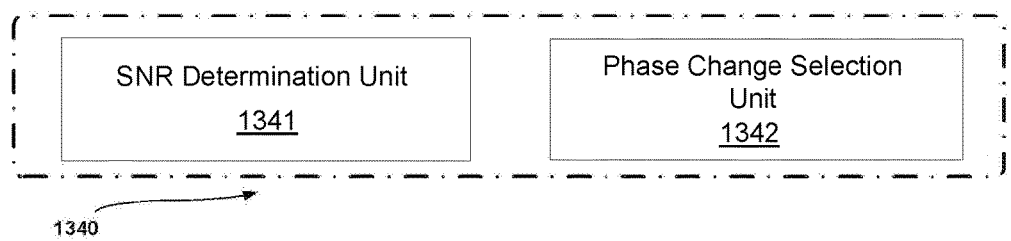

In an embodiment, the phase change selection section 1340 may comprise an SNR determination unit 1341 and a phase change selection unit 1342 as illustrated in FIG. 15. The SNR determination unit 1341 may be configured to determine SNRs for the rotated collections of constellation symbols. The phase change selection unit 1342 may be configured to select one of the phase change candidates corresponding to one of the rotated collections of constellation symbols, in such a manner that the SNR for said one of the rotated collections of constellation symbols is the highest one of said SNRs.

Figure 16:
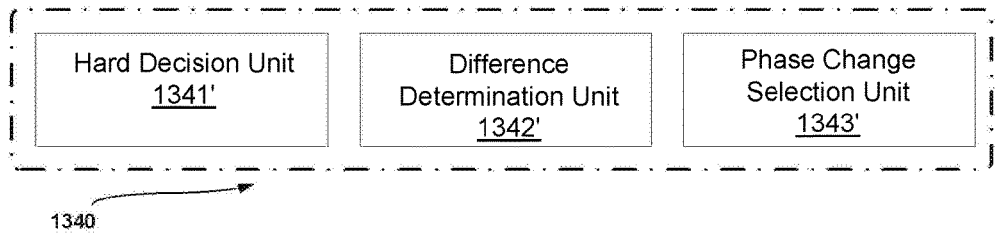

In an embodiment, the phase change selection section 1340 may comprise a hard decision unit 1341', a difference determination unit 1342' and a phase change selection unit 1343' as illustrated in FIG. 16. The hard decision unit 1341' may be configured to perform hard decision on the rotated collections of constellation symbols to obtain corresponding collections of constellation points. The difference determination unit 1342' may be configured to determine differences between the rotated collections of constellation symbols and their corresponding collections of constellation points. The phase change selection unit 1343' may be configured to select one of the phase change candidates corresponding to one of the rotated collections of constellation symbols, in such a manner that the difference between said one of the rotated collections of constellation symbols and its corresponding collection of constellation points is the minimum one of the differences.

In an embodiment, the difference determination unit 1342' may be configured to determine the differences between the rotated collections of constellation symbols and their corresponding collections of constellation points as $((v_n - \bar{v}_n) \cdot w_n) \times ((v_n - \bar{v}_n) \cdot w_n)^H$, wherein $v_n$ denotes a vector formed by one of the rotated collections of constellation symbols, $\bar{v}_n$ denotes a vector formed by one of the collections of constellation points corresponding to said one of the rotated collections of constellation symbols, $w_n$ denotes a vector formed by amplitudes of said one of the rotated collections of constellation symbols and $(.)^H$ denotes a conjugate transpose operation.

In an embodiment, the phase change candidate determination section 1310 may be configured to determine the phase change candidates as a sequence of values in a range of $$[-\frac{\pi}{4}, \frac{\pi}{4}).$$

The sequence of values may be equally spaced in the range of $$[-\frac{\pi}{4}, \frac{\pi}{4}).$$

In an embodiment, the frequency offset determination section 1350 may be configured to determine the frequency offset as the selected phase change candidate divided by $2\pi t_{i-iref}$, wherein $t_{i-iref}$ denotes a time offset between the data symbol and the first reference symbol.

By determining the phase change candidates as the sequence of values in the range of $[-\pi/4, \pi/4)$ and determining the frequency offset as the selected phase change candidate divided by $2\pi t_{i\text{-}iref}$, a maximum frequency offset of 1.75 kHz may be estimated for uplink reception. At the 2.6 GHz frequency band which is the operation band for LTE systems, even a moving speed up to 201 km/h cannot cause a Doppler frequency shift higher than 1.75 kHz. Accordingly, an accurate frequency offset can be estimated for a majority of LTE terminal devices in the real world which move at a speed lower than 201 km/h.

Figure 17:
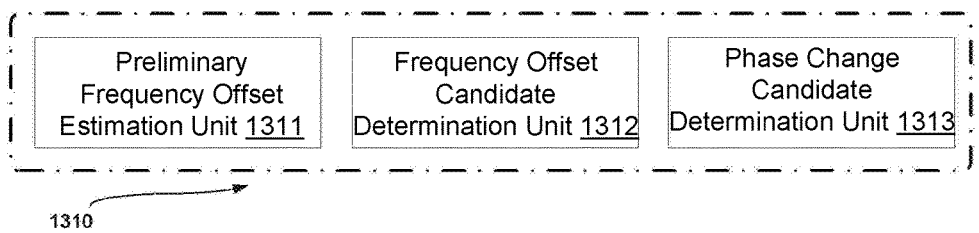

In an embodiment, the phase change candidate determination section 1310 may comprise a preliminary frequency offset estimation unit 1311, a frequency offset candidate determination unit 1312 and a phase change candidate determination unit 1313 as illustrated in FIG. 17. The preliminary frequency offset estimation unit 1311 may be configured to estimate a preliminary frequency offset based on a phase change between a second and a third reference symbols in the signal. The frequency offset candidate determination unit 1312 may be configured to determine a plurality of frequency offset candidates as a sequence of values centered around the preliminary frequency offset. The phase change candidate determination unit 1313 may be configured to determine the plurality of phase change candidates based on the frequency offset candidates and a time offset between the data symbol and the first reference symbol.

In an embodiment, the sequence of values may be equally spaced by an observation frequency, wherein the observation frequency is equal to a reciprocal of a time distance between the second and the third reference symbols. The first reference symbols may be one of the second and the third reference symbols.

By determining the plurality of phase change candidates for the phase change between the data symbol and the first reference symbol in the signal as above and determining the frequency offset as the selected phase change candidate divided by $2\pi t_{i\text{-}iref}$, the maximum estimable frequency offset for uplink reception may be increased beyond 1.75 kHz. Accordingly, an accurate frequency offset can be estimated for LTE terminal devices moving at an arbitrarily high speed.

Figure 18:
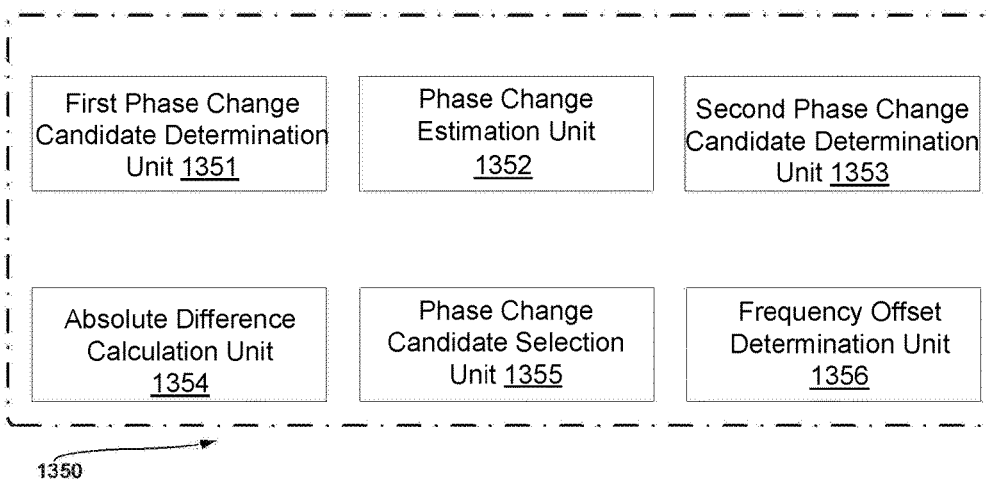

In an embodiment, the frequency offset determination section 1350 may comprise a first phase change candidate determination unit 1351, a phase change estimation unit 1352, a second phase change candidate determination unit 1353, an absolute difference calculation unit 1354, a phase change candidate selection unit 1355 and a frequency offset determination unit 1356 as illustrated in FIG. 18. The first phase change candidate determination unit 1351 may be configured to determining a first group of phase change candidates as a sequence of values centered around the selected phase change candidate and equally spaced by $\pi/2$. The phase change estimation unit 1352 may be configured to estimate a phase change between the second and the third reference symbols in the signal. The second phase change candidate determination unit 1353 may be configured to determine a second group of phase change candidates as a sequence of values centered around the estimated phase change and equally spaced by $2\pi$. The absolute difference calculation unit 1354 may be configured to calculate absolute differences between individual phase change candidates among the first group of phase change candidates scaled by $t_d/t_{i\text{-}iref}$ and individual phase change candidates among the second group of phase change candidates, wherein $t_{i\text{-}iref}$ denotes a time offset between the data symbol and the first reference symbol and $t_d$ denotes a time distance between the second and the third reference symbols. The phase change candidate selection unit 1355 may be configured to select one of the first group of phase change candidates and one of the second group of phase change candidates, in such a manner that the absolute difference between said one of the first group of phase change candidates scaled by $t_d/t_{i\text{-}iref}$ and said one of the second group of phase change candidates is the minimum one of the calculated absolute differences. The frequency offset determination unit 1356 may be configured to determine the frequency offset as said one of the first group of phase change candidate divided by $2\pi t_{i\text{-}iref}$ or said one of the second group of phase change candidates divided by $2\pi t_d$.

By determining the phase change candidates as the sequence of values in the range of $[-\pi/4, \pi/4)$ and determining the frequency offset as above, the limitation on the maximum estimable frequency offset may also be eliminated.

In an embodiment, the data symbol may be the closest data symbol to the first reference symbol. The signal may be an OFDM signal, and the data and reference symbols may be OFDM data and reference symbols.

In light of the above-described functional architecture of the wireless communication device 1300, those skilled in the art can conceive various implementations, wherein the functional blocks of the wireless communication device 1300 may be implemented in hardware, software, and/or firmware.

As an exemplary implementation, the above-described sections may be implemented separately as suitable dedicated circuits. Nevertheless, they can also be implemented using any number of dedicated circuits through functional combination or separation. In one embodiment, the above sections may be combined in a single application specific integrated circuit (ASIC).

Figure 19:
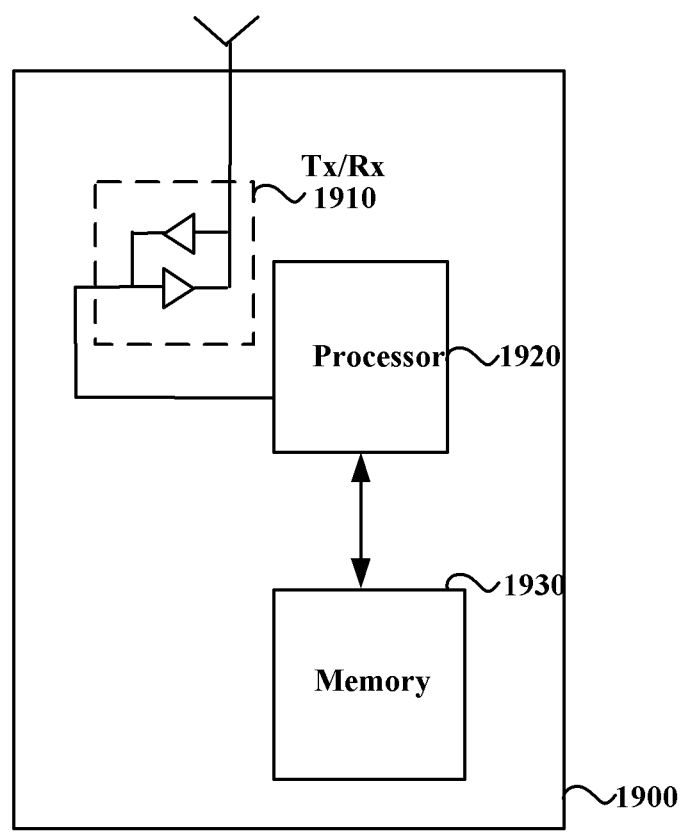
FIG. 19 is a block diagram illustrating an exemplary hardware implementation of the wireless communication device according to embodiments of the present disclosure.

As an alternative implementation, there may be provided a wireless communication device 1900 comprising a transceiver 1910, a processor 1920 (including but not limited to a microprocessor, a microcontroller or a Digital Signal Processor (DSP), etc.) coupled to the transceiver 1910, and a memory 1930 coupled to the processor 1920, as illustrated in FIG. 19. The transceiver 1910 is for bidirectional wireless communications and has at least one antenna to facilitate communication. The memory 1930 stores machine-readable program code. The machine-readable program code may include program instructions that, when executed by the processor 1920, enable the wireless communication device 1900 to operate in accordance with the exemplary embodiments of this disclosure. For example, the program code and the processor 1920 may embody the phase change candidate determination section 1310, the constellation symbol collection generation section 1320, the rotation section 1330, the phase change selection section 1340 and the frequency offset determination section 1350 to perform the respective operations.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method implemented in a wireless communication device for estimating a frequency offset between a carrier frequency of a received signal and a frequency of a local oscillator, the method comprising:

determining a plurality of phase change candidates for a phase change between a data symbol and a first reference symbol in the received signal;
generating a collection of constellation symbols from the data symbol;
rotating the collection of constellation symbols by the plurality of phase change candidates;
selecting one of the phase change candidates corresponding to one of the rotated collections of constellation symbols, in such a manner that said one of the rotated collections of constellation symbols matches a set of constellation points best; and
determining the frequency offset based on the selected phase change candidate.

2. The method of claim 1, wherein the generating the collection of constellation symbols from the data symbol comprises:
demodulating the data symbol to obtain multiple constellation symbols; and
selecting a subset of the multiple constellation symbols as the collection of constellation symbols.

3. The method of claim 1, wherein the selecting one of the phase change candidates corresponding to one of the rotated collections of constellation symbols comprises:
determining Signal to Noise Ratios (SNRs) for the rotated collections of constellation symbols; and
selecting one of the phase change candidates corresponding to one of the rotated collections of constellation symbols, in such a manner that the SNR for said one of the rotated collections of constellation symbols is the highest one of said SNRs.

4. The method of claim 1, wherein the selecting one of the phase change candidates corresponding to one of the rotated collections of constellation symbols comprises:
performing hard decision on the rotated collections of constellation symbols to obtain corresponding collections of constellation points;
determining differences between the rotated collections of constellation symbols and their corresponding collections of constellation points as $((v_n - \bar{v}_n) \cdot w_n) \times ((v_n - \bar{v}_n) \cdot w_n)^H$, wherein $v_n$ denotes a vector formed by one of the rotated collections of constellation symbols, $\bar{v}_n$ denotes a vector formed by one of the collections of constellation points corresponding to said one of the rotated collections of constellation symbols, $w_n$ denotes a vector formed by amplitudes of said one of the rotated collections of constellation symbols, and $(.)^H$ denotes a conjugate transpose operation; and
selecting one of the phase change candidates corresponding to one of the rotated collections of constellation symbols, in such a manner that the difference between said one of the rotated collections of constellation symbols and its corresponding collection of constellation points is the minimum one of the differences.

5. The method of claim 1, wherein the determining the phase change candidates comprises:
determining the phase change candidates as a sequence of values in a range of $$[-\frac{\pi}{4}, \frac{\pi}{4}),$$

wherein the sequence of values are equally spaced in the range of $$[-\frac{\pi}{4}, \frac{\pi}{4}).$$

6. The method of claim 5, wherein the determining the frequency offset comprises:
determining a first group of phase change candidates as a sequence of values centered around the selected phase change candidate and spaced by $$\frac{\pi}{2};$$

estimating a phase change between the second and the third reference symbols in the signal;
determining a second group of phase change candidates as a sequence of values centered around the estimated phase change and spaced by $2\pi$;
calculating absolute differences between individual phase change candidates among the first group of phase change candidates scaled by $t_d/t_{i\text{-}iref}$ and individual phase change candidates among the second group of phase change candidates, wherein $t_{i\text{-}iref}$ denotes a time offset between the data symbol and the first reference symbol and $t_d$ denotes a time distance between the second and the third reference symbols;
selecting one of the first group of phase change candidates and one of the second group of phase change candidates, in such a manner that the absolute difference between said one of the first group of phase change candidates scaled by $t_d/t_{i\text{-}iref}$ and said one of the second group of phase change candidates is the minimum one of the calculated absolute differences; and
determining the frequency offset as said one of the first group of phase change candidate divided by $2\pi t_{i\text{-}iref}$ or said one of the second group of phase change candidates divided by $2\pi t_d$.

7. The method of claim 1, wherein the determining the phase change candidates comprises:
estimating a preliminary frequency offset based on a phase change between a second and a third reference symbols in the signal;
determining a plurality of frequency offset candidates as a sequence of values centered around the preliminary frequency offset, wherein the sequence of values are equally spaced by an observation frequency, wherein the observation frequency is equal to a reciprocal of a time distance between the second and the third reference symbols; and
determining the plurality of phase change candidates based on the frequency offset candidates and a time offset between the data symbol and the first reference symbol.

8. The method of claim 7, wherein the first reference symbol is one of the second and the third reference symbols.

9. The method of claim 1, wherein the determining the frequency offset comprises:
determining the frequency offset as the selected phase change candidate divided by $2\pi t_{i\text{-}iref}$, wherein $t_{i\text{-}iref}$ denotes a time offset between the data symbol and the first reference symbol.

10. The method of claim 1, wherein the data symbol is the closest data symbol to the first reference symbol.

11. The method of claim 1, wherein the signal is an Orthogonal Frequency Division Multiplexing (OFDM) signal and the data and reference symbols are OFDM data and reference symbols.

12. A wireless communication device for estimating a frequency offset between a carrier frequency of a received signal and a frequency of a local oscillator, the wireless communication device comprises a processor and a memory; the memory has machine-readable program code stored therein, when executed by the processor, the program code causes the communication device to:
- determine a plurality of phase change candidates for a phase change between a data symbol and a first reference symbol in the received signal;
- generate a collection of constellation symbols from the data symbol;
- rotate the collection of constellation symbols by the plurality of phase change candidates;
- select one of the phase change candidates corresponding to one of the rotated collections of constellation symbols, in such a manner that said one of the rotated collections of constellation symbols matches a set of constellation points best; and
- determine the frequency offset based on the selected phase change candidate.

13. The wireless communication device of claim 12, wherein the processor is configured to:
- demodulate the data symbol to obtain multiple constellation symbols; and
- select a subset of the multiple constellation symbols as the collection of constellation symbols.

14. The wireless communication device of claim 12, wherein processor is configured to:
- determine Signal to Noise Ratios (SNRs) for the rotated collections of constellation symbols; and
- select one of the phase change candidates corresponding to one of the rotated collections of constellation symbols, in such a manner that the SNR for said one of the rotated collections of constellation symbols is the highest one of said SNRs.

15. The wireless communication device of claim 12, wherein the processor is configured to:
- perform hard decision on the rotated collections of constellation symbols to obtain corresponding collections of constellation points;
- determine differences between the rotated collections of constellation symbols and their corresponding collections of constellation points as $((v_n-\bar{v}_n) \cdot w_n) \times ((v_n-\bar{v}_n) \cdot w_n)^H$, wherein $v_n$ denotes a vector formed by one of the rotated collections of constellation symbols, $\bar{v}_n$ denotes a vector formed by one of the collections of constellation points corresponding to said one of the rotated collections of constellation symbols, $w_n$ denotes a vector formed by amplitudes of said one of the rotated collections of constellation symbols and $(.)^H$ denotes a conjugate transpose operation; and
- select one of the phase change candidates corresponding to one of the rotated collections of constellation symbols, in such a manner that the difference between said one of the rotated collections of constellation symbols and its corresponding collection of constellation points is the minimum one of the differences.

16. The wireless communication device of claim 12, wherein the processor is configured to:
- determine the phase change candidates as a sequence of values in a range of $$[-\frac{\pi}{4}, \frac{\pi}{4}),$$

wherein the sequence of values are equally spaced in the range of $$[-\frac{\pi}{4}, \frac{\pi}{4}).$$

17. The wireless communication device of claim 16, wherein processor is configured to:
- determine a first group of phase change candidates as a sequence of values centered around the selected phase change candidate and equally spaced by $$\frac{\pi}{2};$$

- estimate a phase change ($\emptyset_{diff}$) between the second and the third reference symbols in the signal;
- determine a second group of phase change candidates as a sequence of values centered around the estimated phase change and equally spaced by $2\pi$;
- calculate absolute differences between individual phase change candidates among the first group of phase change candidates scaled by $t_d/t_{i-iref}$ and individual phase change candidates among the second group of phase change candidates, wherein $t_{i-iref}$ denotes a time offset between the data symbol and the first reference symbol and $t_d$ denotes a time distance between the second and the third reference symbols;
- select one of the first group of phase change candidates and one of the second group of phase change candidates, in such a manner that the absolute difference between said one of the first group of phase change candidates scaled by $t_d/t_{i-iref}$ and said one of the second group of phase change candidates is the minimum one of the calculated absolute differences; and
- determine the frequency offset as said one of the first group of phase change candidate divided by $2\pi t_{i-iref}$ or said one of the second group of phase change candidates divided by $2\pi t_d$.

18. The wireless communication device of claim 12, wherein the processor is configured to:
- estimate a preliminary frequency offset based on a phase change between a second and a third reference symbols in the signal;
- determine a plurality of frequency offset candidates as a sequence of values centered around the preliminary frequency offset, wherein the sequence of values are equally spaced by an observation frequency, wherein the observation frequency is equal to a reciprocal of a time distance between the second and the third reference symbols; and
- determine the plurality of phase change candidates based on the frequency offset candidates and a time offset between the data symbol and the first reference symbol, wherein the first reference symbol is one of the second and the third reference symbols.

19. The wireless communication device of claim 12, wherein processor is configured to:

determine the frequency offset as the selected phase change candidate divided by $2\pi t_{i\text{-}iref}$, wherein $t_{i\text{-}iref}$ denotes a time offset between the data symbol and the first reference symbol.

20. The wireless communication device of claim 12, wherein the data symbol is the closest data symbol to the first reference symbol.

* * * * *